(12) United States Patent
Yao et al.

(10) Patent No.: US 7,729,120 B2
(45) Date of Patent: Jun. 1, 2010

(54) HEAT SINK APPARATUS

(75) Inventors: Zhi-Jiang Yao, Shenzhen (CN);
Ning-Yu Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/184,848

(22) Filed: Aug. 1, 2008

(65) Prior Publication Data

US 2010/0002380 A1 Jan. 7, 2010

(30) Foreign Application Priority Data

Jul. 3, 2008 (CN) .................. 2008 2 0301433 U

(51) Int. Cl.
*H05K 7/20* (2006.01)

(52) U.S. Cl. .................. 361/700; 361/699; 361/707; 361/719; 174/15.2; 174/16.3; 165/80.3; 165/80.4; 165/104.26

(58) Field of Classification Search .................. None
See application file for complete search history.

(56) References Cited

U.S. PATENT DOCUMENTS

| 6,166,907 | A | 12/2000 | Chien | |
|---|---|---|---|---|
| 6,415,612 | B1 * | 7/2002 | Pokharna et al. | 62/3.2 |
| 2006/0067057 | A1 * | 3/2006 | Shen et al. | 361/709 |
| 2007/0171616 | A1 * | 7/2007 | Peng et al. | 361/700 |
| 2008/0007914 | A1 * | 1/2008 | Peng et al. | 361/700 |

* cited by examiner

*Primary Examiner*—Boris L Chervinsky
(74) *Attorney, Agent, or Firm*—Frank R. Niranjan

(57) ABSTRACT

A heat sink apparatus for dissipating heat generated from a heat generating component includes a first heat dissipating assembly attached to one side of the heat generating component, a second heat dissipating assembly attached to another side of the heat generating component; and a connecting device connecting between the first heat dissipating assembly and the second heat dissipating assembly thereby forming a continuous heat dissipation passage between the first heat dissipating assembly and the second heat dissipating assembly.

15 Claims, 3 Drawing Sheets

HEAT SINK APPARATUS

BACKGROUND

1. Technical Field

The present invention relates to a heat sink apparatus for dissipating heat generated by a heat generating component on a circuit board and an electronic device using the heat sink apparatus.

2. Description of Related Art

Electronic components in computers, such as central processing units (CPUs), can generate a lot of heat during normal operation. The heat can deteriorate the operational stability of the electronic components and damage the electronic components. Thus, the heat must be removed quickly to maintain an acceptable operating temperature of the CPUs and other electronic components in the computers. One solution for removing heat from the CPU is by mounting a heat sink on the CPU.

A typical heat sink apparatus for a CPU includes a base mounted on the CPU, a plurality of fins extending from a surface of the base, and at least one heat pipe. A first end of the heat pipe is attached between the base and a bottom portion of the fins. A second end of the heat pipe is inserted through the fins. The heat pipe is bent at an angle of 90° twice to achieve the above route. However, heat dissipation performance of the heat pipe is impaired because the heat pipe is bent greatly creating a tortuous path thereby restricting flow through the heat pipe. Thus, the heat sink apparatus cannot dissipate heat efficiently.

Therefore a heat sink apparatus capable of dissipating heat more efficiently is desired to overcome the above-described shortcoming.

DETAILED DESCRIPTION OF THE EMBODIMENTS

Figure 1:
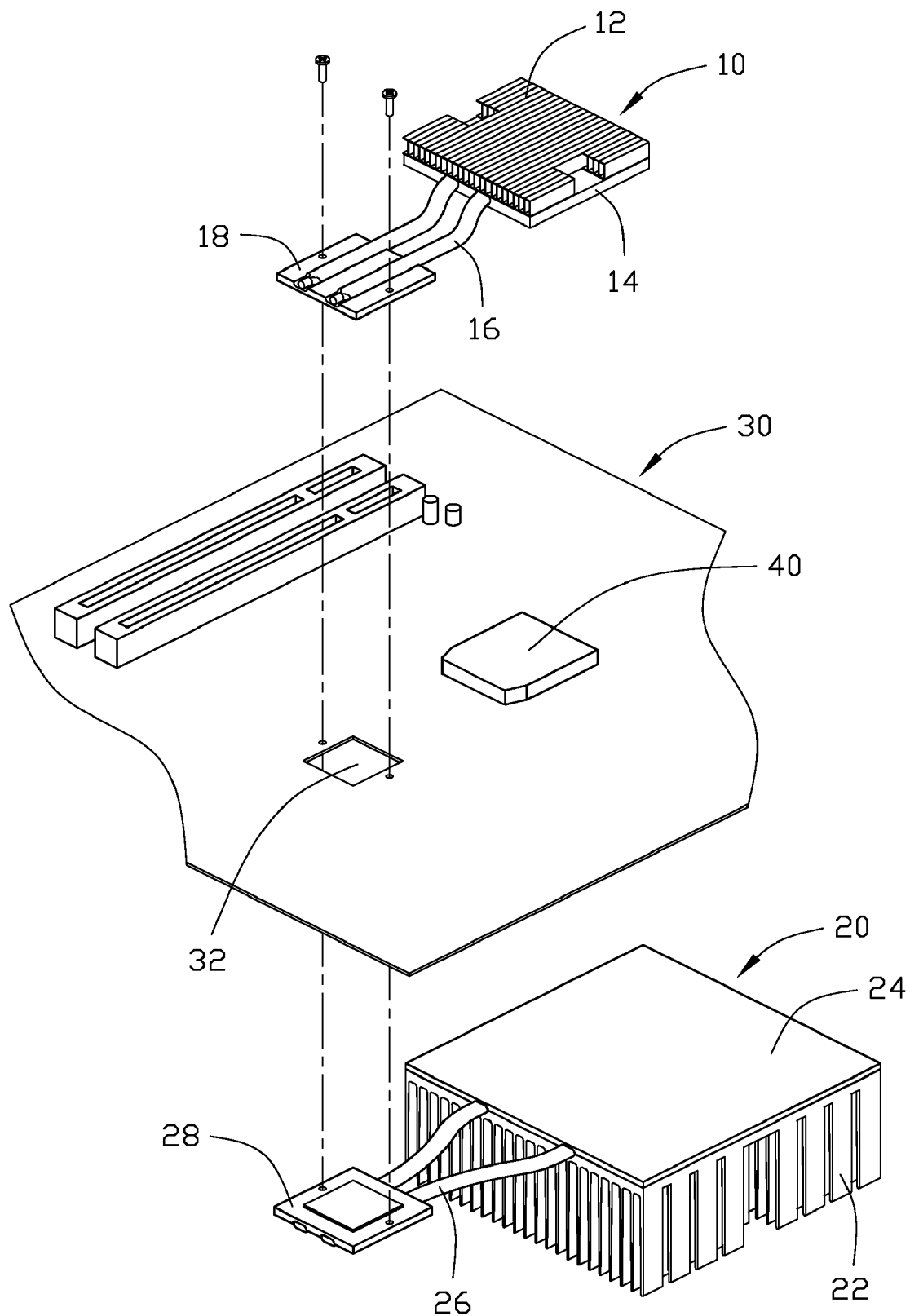
FIG. 1 is an exploded, isometric view of an embodiment of a heat sink apparatus, the heat sink apparatus including a first heat dissipating assembly and a second heat dissipating assembly for dissipating heat generated from a CPU on a motherboard.
Figure 2:
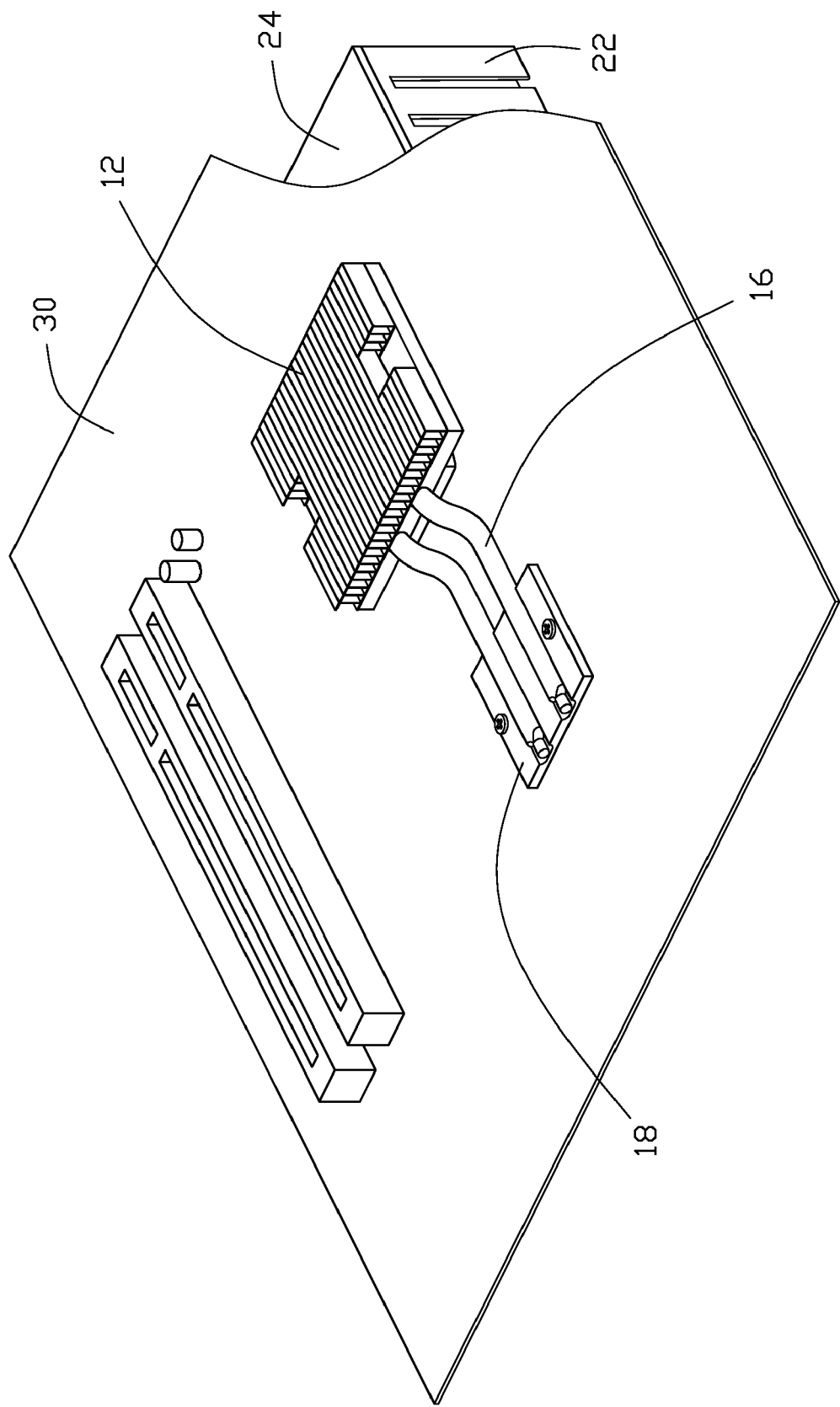
FIG. 2 is an assembled, isometric view of the heat sink apparatus of FIG. 1.

Referring to FIG. 1, a heat sink apparatus includes a first heat dissipation assembly 10 and a second heat dissipation assembly 20. The first heat dissipation assembly 10 and the second heat dissipation assembly 20 are attached to opposite sides of a motherboard 30. The first and second heat dissipation assembly 10, 20 are configured for dissipating heat generated from a CPU 40 on the motherboard 30.

The first heat dissipation assembly 10 includes a first base 14, a plurality of fins 12 extending perpendicularly from the first base 14, at least one first heat pipe 16, and a first connecting panel 18. Each of the at least one first heat pipe 16 has a distal end secured between the first base 14 and a bottom of the fins 12, and a proximal end secured to the first connecting panel 18.

The second heat dissipation assembly 20 includes a second base 24, a plurality of fins 22 extending perpendicularly from the second base 24, at least one second heat pipe 26, and a second connecting panel 28. Each of the at least one second heat pipe 26 has a distal end secured between the second base 24 and a bottom of the fins 22, and a proximal end secured to the second connecting panel 28.

The first base 14 is attached to the CPU 40 and the second base 24 is attached to a backside of the motherboard 30. The first connecting panel 18 and the second connecting panel 28 are attached to two opposite sides of the motherboard 30 and contacting each other via an opening 32 defined in the motherboard 30. In the embodiment of FIG. 1, a thermal interface material is adhered between the first connecting panel 18 and the second connecting panel 28 to enhance heat conduction.

In the embodiment of FIG. 1, each first heat pipe 16 and each second heat pipe 26 are bent slightly forming slight bends to avoid impairing heat transfer performance. Each slight bend has an angle that is approximately equal to 180° to minimize flow impairment of each first and second heat pipe 16, 26.

Figure 3:
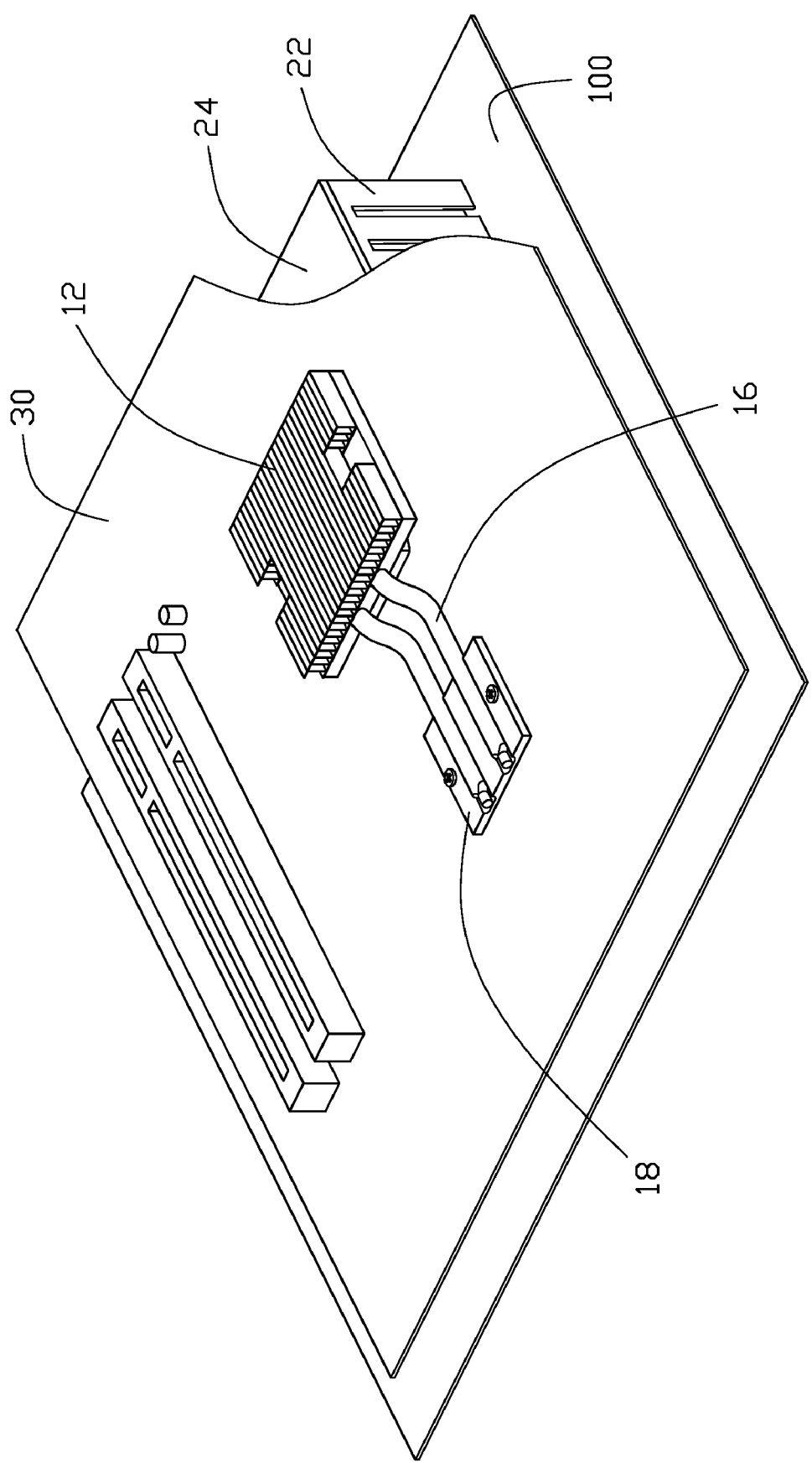
FIG. 3 is an assembled, isometric view of the heat sink apparatus of FIG. 1, with the second heat dissipating assembly contacting a metal chassis.

Referring to FIG. 3, the motherboard 30 is mounted in a chassis (not shown). In the embodiment of FIG. 3, the second heat dissipating assembly 20 contacts a metal panel 100 of the chassis. The metal panel 100 assists the second heat dissipating assembly 20 to conduct heat away from the CPU 40.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

What is claimed is:

1. A heat sink apparatus for dissipating heat generated from a heat generating component attached to a top surface of a circuit board, the heat sink apparatus comprising:
   a first heat dissipating assembly attached to the heat generating component;
   a second heat dissipating assembly attached to a bottom surface of the circuit board; and
   a connecting device thermally connecting the first heat dissipating assembly to the second heat dissipating assembly, thereby forming a continuous heat dissipation passage between the first heat dissipating assembly and the second heat dissipating assembly;
   wherein the connecting device comprises a first connecting panel connected to the first heat dissipating assembly and a second connecting panel connected to the second heat dissipating assembly, the first connecting panel and the second connecting panel are attached to opposite sides of the circuit board and thermally connected to each other.

2. The heat sink apparatus of claim 1, wherein the first heat dissipating assembly comprises a first base attached to the heat generating component, a plurality of first fins extending from the first base, and at least one first heat pipe; a proximal end of the at least one first heat pipe is thermally connected to the first base and a distal end of the at least one first heat pipe is in thermal communication with the connecting device.

3. The heat sink apparatus of claim 2, wherein a bend angle of the at least one first heat pipe is more than 90° and less than 180°.

4. The heat sink apparatus of claim 2, wherein the second heat dissipating assembly comprises a second base, a plurality of fins extending from the second base, and at least one second heat pipe; a proximal end of the at least one second heat pipe is thermally connected to the second base and a distal end of the at least one second heat pipe is in thermal communication with the connecting device.

5. The heat sink apparatus of claim 4, wherein a bend angle of the at least one second heat pipe is more than 90° and less than 180°.

6. The heat sink apparatus of claim 4, wherein the first connecting panel is connected to the distal end of the at least one first heat pipe, and the second connecting panel is connected to the distal end of the at least one second heat pipe.

7. The heat sink apparatus of claim 6, wherein the first connecting panel and the second connecting panel are thermally connected to each other via a thermal interface material.

8. An electronic device comprising:
a circuit board;
a heat generating component attached to a top surface of the circuit board;
a first heat dissipating assembly comprising a first base attached to the heat generating component, a first connecting panel, and at least one first heat pipe, a proximal end of the at least one first heat pipe is thermally connected to the first base and a distal end of the at least one first heat pipe is thermally connected to the first connecting panel;
second heat dissipating assembly comprising a second base attached to a bottom surface of the circuit board, a second connecting panel in thermal communication with the first connecting panel, and at least one second heat pipe; a proximal end of the at least one second heat pipe is thermally connected to the second base and a distal end of the at least one second heat pipe is thermally connected to the second connecting panel.

9. The electronic device of claim 8, wherein a bend angle of the first heat pipe is more than 90° and less than 180°.

10. The electronic device of claim 8, wherein a bend angle of the second heat pipe is more than 90° and less than 180°.

11. The electronic device of claim 8, wherein the first connecting panel is thermally connected to the second connecting panel via a thermal interface material.

12. The electronic device of claim 8, wherein an opening is defined in the circuit board; the first and second connecting panel are attached to the top and bottom surface of the circuit board, respectively; the first and second connecting panel cover the opening at the top and bottom surface of the circuit board, respectively; the first and second connecting panel contact each other via the opening.

13. The electronic device of claim 8, wherein the second heat dissipating assembly contacts a metal chassis of the electronic device; the metal chassis conducts heat away from the heat generating component.

14. The electronic device of claim 8, wherein a plurality of cooling fins extends from the first base.

15. The electronic device of claim 8, wherein a plurality of cooling fins extends from the second base.

* * * * *